C. A. HEGE.
Head-Block for Saw-Mills.

No. 196,577. Patented Oct. 30, 1877.

UNITED STATES PATENT OFFICE.

CONSTANTINE A. HEGE, OF SALEM, NORTH CAROLINA.

IMPROVEMENT IN HEAD-BLOCKS FOR SAW-MILLS.

Specification forming part of Letters Patent No. 196,577, dated October 30, 1877; application filed October 8, 1877.

*To all whom it may concern:*

Be it known that I, CONSTANTINE A. HEGE, of Salem, in the county of Forsyth and State of North Carolina, have invented certain new and useful Improvements in Circular-Saw Mills; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1:
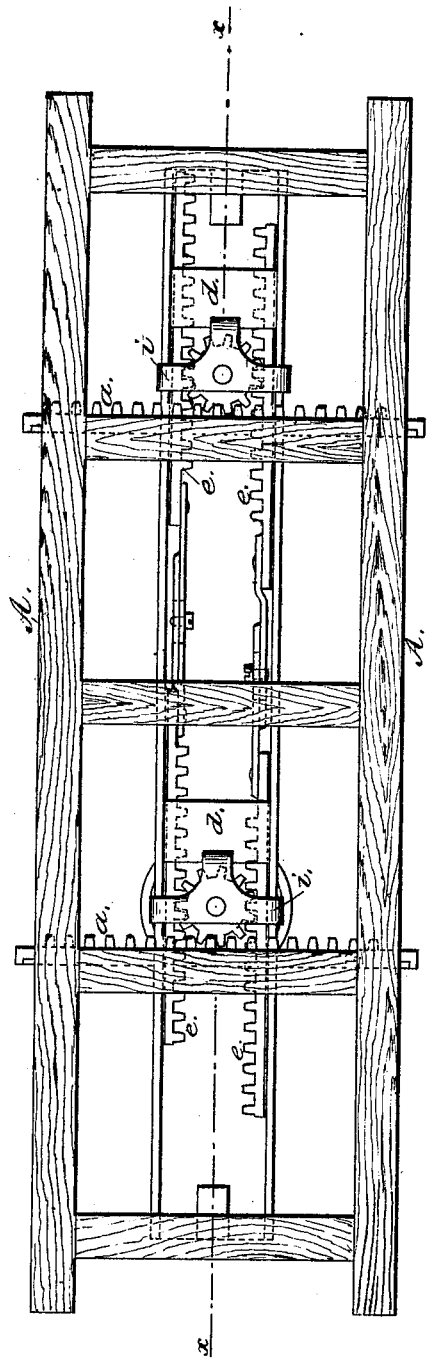
Figure 2:
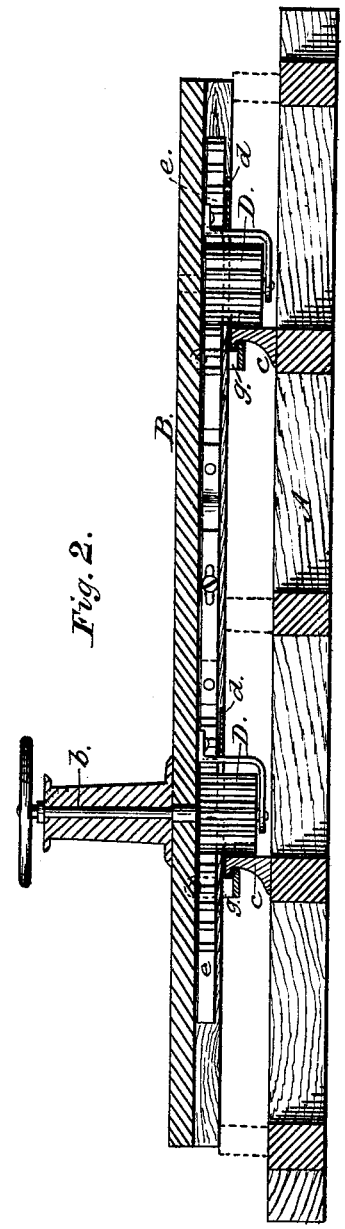

Figure 1 is a bottom view, showing the arrangement for operating the log-beam; and Fig. 2, a longitudinal section through the line $x\ x$ of Fig. 1.

My invention is in the class of circular-saw mills, and has reference to the devices employed for moving the log toward the saw.

The object is to set, with accuracy and facility, the log to be sawed, and to maintain it in such position during the act of sawing that the board produced will throughout its length be of uniform thickness.

To this end the invention consists in a "carriage" with racks transversely across it, a beam for moving the log, with one or more racks free to play along the length of the beam, and pinions or cog-wheels gearing with the transverse and longitudinal racks, for the purpose of operating the "log-beam."

It further consists in having one or both of the longitudinal racks made in sections, the ends of the two sections slotted and held together by bolts or pins, rendering them adjustable in length, whereby both ends of the beam may be brought into the same plane if one should happen to get in advance of the other.

In the accompanying drawings, the letter A denotes the carriage, which moves the log lengthwise to or from the saw as it is sawed. B denotes the beam for setting the log, and it, together with the "dogs" usually employed for the purpose, holds the log in position while being sawed. This beam rests on slide-rails $c$, laid across the carriage, and in the drawing it is represented as channeled on its under side. In this channel are seen two racks, $e$, having a longitudinal play therein, and held in position by plates $d$. Other racks, $a$, are placed transversely on the frame, (represented in the drawing as being on the sides of the slide-rails $c$,) toward the ends of the carriage-frame, and pinions D gear with these racks, as well as with those running the length of the log-beam. These pinions have their bearing in steps $i$, and one of them has a shaft, $b$, with a wheel at the top thereof, by which it is operated.

Instead of the shaft and wheel, a ratchet-wheel may be used to operate the pinion. The log-beam is prevented from sliding off the carriage lengthwise by plates $g$, fastened to the beam and projecting under the head of the rails $c$.

The longitudinal racks $e$ are made in sections, flattened at the ends, where they are slotted, and held firmly together by bolts passing through the slots.

Operation: The log is laid on the slides $c$, and the beam for setting and moving the same is brought next to it in the manner following. The pinions D at the opposite ends of the beam both gear with the longitudinal racks, so that when the pinion at one end is revolved motion is given to the longitudinal racks, and by them imparted to the pinion at the opposite end, and, both of these pinions gearing with the fixed racks on the carriage, the beam is moved toward the saw, carrying with it the log to be sawed.

By means of the gearing at the two ends of the beam and the connecting-racks, I am enabled, from one point, to apply an equal pressure at the same time to different points of the beam, thereby moving the latter and the log to be sawed with uniformity throughout its length toward the saw, thus cutting a board of uniform thickness.

If from any cause one end of the log-beam should get a little in advance of the other, the two ends can be brought to the same plane by adjusting the longitudinal racks. To effect this adjustment the bolts are loosened, so that when the rack is moved but one pinion is revolved, and the end to which that pinion is connected is moved until it is brought into the same plane with the other. The two sections are again joined, and the nuts screwed up tightly, when the device is ready to be operated, as before.

Instead of making both the longitudinal racks adjustable, only one need be made so, and while one rack may work the two pinions, yet I prefer to use two racks.

Having described my invention, what I claim is—

1. The combination of the beam B and carriage A with racks *e* and *a*, and pinions for operating the same, substantially as set forth.

2. The beam B, provided with racks *e*, slotted and joined by bolts, whereby they are rendered adjustable in length, substantially as and for the purpose set forth.

In testimony that I claim the foregoing as my own I affix my signature in presence of two witnesses.

CONSTANTINE ALEXANDER HEGE.

Witnesses:
S. E. ALLEN,
JOHN A. BROWN.